United States Patent [19]

Hausmann

[11] 4,135,756

[45] Jan. 23, 1979

[54] ROLL-OVER PROTECTIVE STRUCTURE FOR VEHICLES AND METHOD OF CONSTRUCTION THEREFOR

[75] Inventor: Winfried Hausmann, Klein-Lobke, Fed. Rep. of Germany

[73] Assignee: Massey-Ferguson Services N.V., Curacao, Netherlands

[21] Appl. No.: 747,271

[22] Filed: Dec. 3, 1976

[30] Foreign Application Priority Data

Dec. 12, 1975 [GB] United Kingdom ............... 50963/75

[51] Int. Cl.² ............................................. B62D 23/00
[52] U.S. Cl. ..................................... 296/28 J; 52/727
[58] Field of Search ................ 52/727, 731, 654, 648; 296/28 J, 28 R, 28 L, 29, 30

[56] References Cited

U.S. PATENT DOCUMENTS

| 157,920 | 12/1874 | Manes ................................... 52/727 |
| 666,146 | 1/1901 | Lanz ..................................... 52/731 |
| 1,828,743 | 10/1931 | Lovell ................................... 296/28 J |
| 3,292,969 | 12/1966 | Eggert ................................. 296/28 J |
| 3,331,177 | 7/1967 | Godfrey ................................ 52/727 |

FOREIGN PATENT DOCUMENTS 646443   7/1928   France ................................. 296/28 J Primary Examiner—Philip Goodman
Attorney, Agent, or Firm—William R. Nolte

[57] ABSTRACT

For use in ROPS, a square section tube-type truss or support is reinforced by a round-section tube which fits snuggly into the first tube (or vice versa). The reinforcement enables the use of only one roll-over frame and the use of the same cab assemblies on light and heavy machines.

5 Claims, 6 Drawing Figures

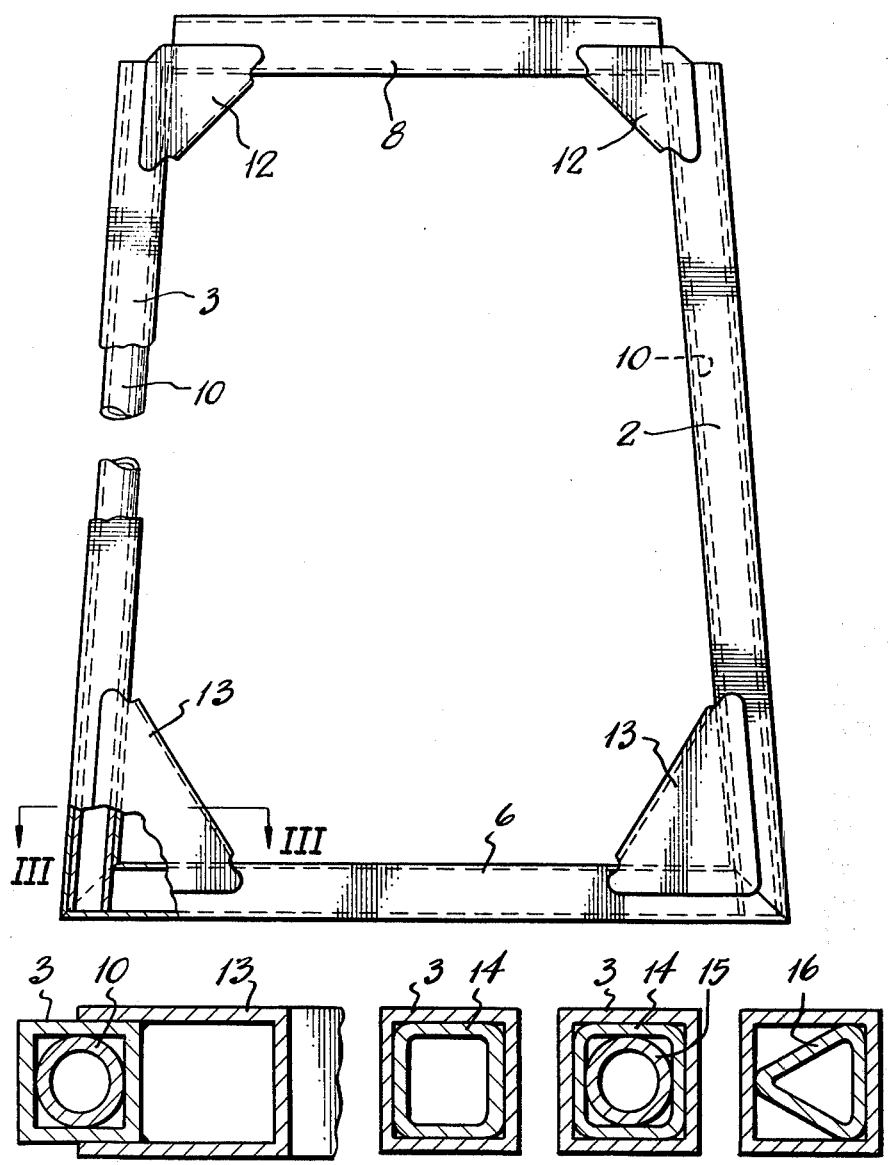

ROLL-OVER PROTECTIVE STRUCTURE FOR VEHICLES AND METHOD OF CONSTRUCTION THEREFOR

The present invention relates to roll over protective structures for vehicles and especially, though not exclusively, for tractors.

Roll-over protective structures for tractors per se are known. They are usually fabricated from lengths of steel tube. Hitherto it has been customary to design the roll over protective structure so that it meets the legal requirements appropriate to the size and weight of a specific vehicle, which may be made in large numbers. It is not usually possible to fit this structure to a second and larger vehicle unless extra strength has been deliberately built in. In such a case the structure is unnecessarily strong for the first vehicle and is consequently unnecessarily expensive.

The object of the present invention is to obviate or mitigate the foregoing disadvantages and to provide an adequately strong protective structure of standard shape and size for a range of vehicles.

According to the present invention a roll-over protective structure for a range of vehicles consists of a series of outer tubular frame members, at least one inner member fitted within one of the outer members prior to securing of the outer tubular members together to form said frame, whereby the dimensions of the inner member is so chosen as to provide adequate reinforcement for said one outer member according to the chosen one of the range of vehicles to which the structure is to be fitted.

Preferably an interior member is a close fit within an exterior member and the interior and exterior members are co-extensive and are secured to each other at their ends for instance, by welding.

According also to the present invention a method of making a roll-over protective structure consists of forming a sufficient number of outer tubular frame members in a known manner, inserting an inner member into at least one of the said outer members, fixing the inner member in position within said outer, and securing the outer tubular frame members together to complete said structure.

The present invention will now be described with reference to the accompanying drawings of which:

FIG. 2 is a view of the rear-most members of the protective structure viewed from the rear of the tractor.

FIG. 3 is a cross section through one of the rear vertical structural members.

FIGS. 4, 5 and 6 are further examples of cross sections of outer and inner frame members which may be used.

Figure 1:
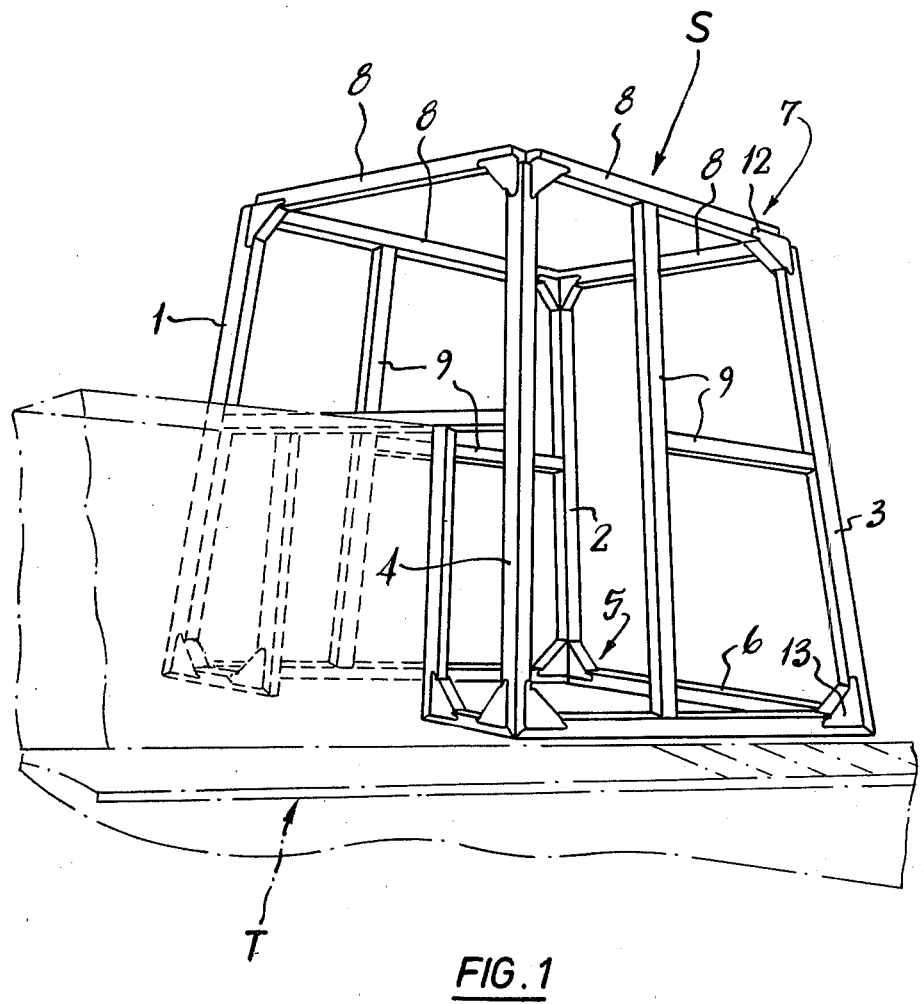
FIG. 1 illustrates a tractor fitted with the roll-over protective structure.

In FIG. 1 the tractor T is identified by dotted outlines to represent one of a range of sizes of tractor to which the suitable strengthened roll-over protective structure S might be fitted.

The structure S is constituted by vertical members 1, 2, 3 and 4 joined below to a lower frame 5 having base members 6 and above to an upper frame 7 having four roof members 8. Intermediate members identified by the reference numeral 9 define several window and door apertures and contribute strength to the structure S. The structure S suitably strengthened, may be fitted to a range of tractors T without altering the outward appearance or dimensions. Also the structure S whatever its strength rating, may form the basis for an enclosed cab by fitting common panels, doors and windows. For the sake of simplicity, the structure S is illustrated in its simple safety version.

The rear-most part of the structure consisting of members 2 and 3 and one of each of members 6 and 8 is shown in FIG. 2. Test legislation in many countries requires a heavy impact load to be applied to a corner, side or front of the top of the protective structure. The load applied is related to the weight of the whole vehicle T.

The most highly stressed members are usually the uprights 2 and 3. The standard or lowest strength structure will have no inner or reinforcing members within the main tubular members 2 and 3 but higher strength structures such as is shown in FIG. 2 will have a reinforcing member 10 shown at the partially cut-away portion of upright member 3. In this case, as will be seen in FIG. 3, the upright member 3 has a square cross section whilst the inner member 10 has an annular cross section and is in fact itself hollow.

In building the structure S each of the upright outer members 1, 2, 3 and 4 is shaped appropriately at its end to be joined to a neighbouring member. In the case of the junction with frame member 6 the joint could be a 45 degree sloping one, or as with frame member 8 it could rely entirely on a gusset plate 12. The inner frame member 10 is inserted into the appropriate outer frame member 2. It can fit relatively loosely in which case the two need to be welded together at both their ends prior to attachment to other frame members e.g. 6 and 8. If the inner frame member 10 is loose it will operate to resist bending at the ends of the outer frame member 3 by virtue of the welded end connections therebetween. As an alternative, the member 10 can be a push or press fit within member 3 in which case there might be no need to weld the two together prior to assembly. The reinforcing assistance given to the outer member 3 in such a case is in shear and in bending at the mid point of the member 3. The most effective resistance to deformation of the upright frame members occurs when the inner member 10 is a tight fit in the outer member 3 and they are welded together at their ends.

The gusset plates 12 and 13 are necessary to transmit bending moments at the corners of the structure and little cost penalty is involved in making these a standard size capable of transmitting the highest loads imposed by the heaviest of the tractors in the range.

The choice of dimensions of outer frame members for the smallest tractor T clearly is dependent on the strength required by law but due consideration should be given in designing the sizes of the basic structure to the need for being able to insert other sizes of tube. Referring to FIG. 3 the annular section of member 10 is clearly a very economical section to use. The embodiment shown in FIG. 3 might be used for a second size of tractor. FIG. 4 shows how a second square section tube 14 would give a third degree of reinforcement whilst FIG. 5 which employs a third reinforcement member 15 shows a further embodiment of the invention which would give a fourth degree of reinforcement.

FIG. 6 shows a further embodiment employing a tube 16 of triangular cross section which might be useful in the case where it is necessary to apply selective reinforcement on one side of one of the principal axes of the outer member 3.

What we claim is:

1. A roll-over protective structure for a range of vehicles consisting of a series of outer tubular frame members, at least one inner member fitted within one of the outer members prior to securing of the outer tubular members together to form said frame, whereby the dimensions of the inner member are so chosen as to provide adequate reinforcement for said one outer member to the chosen one of the range of vehicles to which the structure is to be fitted, said inner member co-extensive with said outer member and welded to said outer member at its end.

2. A roll-over protective structure for a range of vehicles consisting of a series of outer tubular frame members, at least one inner member fitted within one of the outer members prior to securing of the outer tubular members together to form said frame, whereby the dimensions of the inner member are so chosen as to provide adequate reinforcement for said one outer member to the chosen one of the range of vehicles to which the structure is to be fitted, said inner member being of such a length as to enable the two members to be held in a predetermined position relative to each other prior to joining said outer member.

3. The method of making a roll-over protective structure comprising the steps of forming a sufficient number of outer tubular frame members in a known manner, inserting an inner member into at least one of the said outer members, fixing the inner member in position within said outer member, securing the outer tubular frame members together to complete said structure and welding said said inner frame member to said outer frame member.

4. A roll-over protective structure for a range of vehicles consisting of a series of outer tubular frame members, at least one inner member fitted within one of the outer members prior to securing of the outer tubular members together to form said frame, whereby the dimensions of the inner member are so chosen as to provide adequate reinforcement for said one outer member to the chosen one of the range of vehicles to which the structure is to be fitted and a third member within said inner member to further reinforce said outer member.

5. A process of constructing roll-over protective structures of a standard size for first and second vehicles requiring roll-over protective structures of differing strengths, said process comprising the steps of: providing a first plurality of outer tubular frame members capable of being assembled into a roll-over protective structure for a first vehicle, providing a second plurality of outer tubular frame members capable of being assembled into a roll-over protective structure for a second vehicle, the first and second pluralities of outer tubular frame members being initially substantially identical, securing the first plurality of outer tubular frame members together in a prescribed manner to form a first roll-over protective structure for said first vehicle, fixing an inner reinforcing member within at least one of the second plurality of outer tubular frame members, and subsequently securing the second plurality of outer tubular frame members together in said prescribed manner to form a second roll-over protective structure for said second vehicle, said second roll-over protective structure being of the same size but of greater strength than the first roll-over protective structure.

* * * * *